(12) United States Patent
Jägenstedt et al.

(10) Patent No.: US 11,089,732 B2
(45) Date of Patent: Aug. 17, 2021

(54) COLLISION DETECTION FOR A ROBOTIC WORK TOOL (71) Applicant: HUSQVARNA AB, Huskvarna (SE)

(72) Inventors: Patrik Jägenstedt, Tenhult (SE);
Fredrik Kallström, Huskvarna (SE);
Johan Ståhl, Skara (SE)

(73) Assignee: HUSQVARNA AB, Huskvarna (SE)

( * ) Notice: Subject to any disclaimer, the term of this patent is extended or adjusted under 35 U.S.C. 154(b) by 143 days.

(21) Appl. No.: 16/477,275

(22) PCT Filed: Dec. 13, 2017

(86) PCT No.: PCT/SE2017/051258
§ 371 (c)(1),
(2) Date: Jul. 11, 2019

(87) PCT Pub. No.: WO2018/132048
PCT Pub. Date: Jul. 19, 2018

(65) Prior Publication Data
US 2019/0387680 A1    Dec. 26, 2019

(30) Foreign Application Priority Data
Jan. 11, 2017  (SE) .................... 1750013-3

(51) Int. Cl.
*A01D 75/18*    (2006.01)
*A01D 34/00*    (2006.01)
(Continued)

(52) U.S. Cl.
CPC ......... *A01D 75/185* (2013.01); *A01D 34/008* (2013.01); *A01D 75/28* (2013.01);
(Continued)

(58) Field of Classification Search
CPC .... A01D 75/185; A01D 34/008; A01D 75/28; A47L 9/2826; A47L 9/2852;
(Continued)

(56) References Cited

U.S. PATENT DOCUMENTS 7,660,650 B2 *  2/2010  Kawagoe ............ G05D 1/0219
                                                   701/23
8,935,006 B2    1/2015  Vu et al.
(Continued)

FOREIGN PATENT DOCUMENTS

CN    103141210 A    6/2013
EP    1 411 450 A2   4/2004
(Continued)

OTHER PUBLICATIONS

Yuki, I. et al.,"Development of the trimmer-type mowing system against a slope", Conference Proceedings Article, International Conference on Advanced Mechatronic Systems (ICAMechS), pp. 23-29 (Nov. 30-Dec. 3, 2016).
(Continued)

*Primary Examiner* — Brian P Sweeney
(74) *Attorney, Agent, or Firm* — Burr & Forman, LLP (57) ABSTRACT

A robotic work tool comprising a motor for driving at least one wheel, an inclination sensor and a controller for controlling the operation of the robotic work tool, the controller being configured to; receive a signal indicating a collision; determine if the signal indicating a collision is above a collision threshold level and, if so, determine that a collision has been detected, the robotic work tool being characterized in that the controller is further configured to: receive an indication of an inclination; and to adapt the collision threshold accordingly based on said indication of an inclination.

12 Claims, 4 Drawing Sheets

(51) Int. Cl.

| | | |
|---|---|---|
| *A01D 75/28* | (2006.01) | |
| *A47L 9/28* | (2006.01) | |
| *A47L 11/40* | (2006.01) | |
| *G05D 1/02* | (2020.01) | |
| *G05D 1/03* | (2006.01) | |
| *B60W 30/085* | (2012.01) | |
| *B60W 30/08* | (2012.01) | |

(52) U.S. Cl.
CPC ........... *A47L 9/2826* (2013.01); *A47L 9/2852* (2013.01); *A47L 11/4011* (2013.01); *A47L 11/4061* (2013.01); *B60W 30/085* (2013.01); *G05D 1/027* (2013.01); *G05D 1/0265* (2013.01); *G05D 1/03* (2013.01); *A47L 2201/04* (2013.01); *B60W 2030/082* (2013.01); *G05D 2201/0208* (2013.01)

(58) Field of Classification Search
CPC .............. A47L 11/4011; A47L 11/4061; A47L 2201/04; A47L 9/2831; B60W 30/085; B60W 2030/082; G01C 9/00; G05D 1/02; G05D 1/0265; G05D 1/027; G05D 1/03; G05D 2201/0208
See application file for complete search history.

(56) References Cited

U.S. PATENT DOCUMENTS

| | | |
|---|---|---|
| 2003/0144774 A1 | 7/2003 | Trissel et al. |
| 2005/0288079 A1 | 12/2005 | Tani |
| 2008/0262669 A1 | 10/2008 | Smid et al. |
| 2009/0043440 A1 | 2/2009 | Matsukawa et al. |
| 2009/0198380 A1 | 8/2009 | Friedman et al. |
| 2010/0234998 A1 | 9/2010 | Kim |
| 2012/0265391 A1 | 10/2012 | Letsky |
| 2013/0192183 A1 | 8/2013 | Choi et al. |
| 2014/0012453 A1 | 1/2014 | Johnson et al. |
| 2014/0121876 A1 | 5/2014 | Chen et al. |
| 2014/0373497 A1 | 12/2014 | Bjorn et al. |
| 2015/0250372 A1 | 9/2015 | T P et al. |
| 2016/0062345 A1 | 3/2016 | Stubbs et al. |
| 2016/0157422 A1 | 6/2016 | Kohler et al. |
| 2016/0158941 A1 | 6/2016 | Hung et al. |
| 2016/0280036 A1 | 9/2016 | Ishikawa |
| 2016/0282862 A1 | 9/2016 | Duffley et al. |

FOREIGN PATENT DOCUMENTS

| | | |
|---|---|---|
| WO | 2013/125995 A1 | 8/2013 |
| WO | 2014/007728 A1 | 1/2014 |
| WO | 2014/027945 A1 | 2/2014 |
| WO | 2016102146 A1 | 6/2016 |

OTHER PUBLICATIONS

International Search Report and Written Opinion for International Application No. PCT/SE2017/051258 dated Feb. 8, 2018.
International Preliminary Report on Patentability for International Application No. PCT/SE2017/051258 dated Jul. 16, 2019.

* cited by examiner

COLLISION DETECTION FOR A ROBOTIC WORK TOOL

TECHNICAL FIELD

This application relates to robotic work tools and in particular to a robotic work tool and a method for performing improved collision detection to be performed by a robotic work tool, such as a lawnmower.

BACKGROUND

Automated or robotic power tools such as robotic lawnmowers are becoming increasingly more popular. In a typical deployment, a work area, such as a garden, is enclosed by a boundary cable with the purpose of keeping the robotic lawnmower inside the work area. The robotic lawnmower is typically configured to work in a random pattern inside the work area. As such, it does not take into account objects, such as trees, furniture and walls inside the work area and to avoid the robotic work tool from simply stopping when an object is encountered, butting against the object until it runs out of battery various collision detection systems have been developed. These enable a robotic work tool to detect that an object has been collided with and in turn adapts its operation accordingly, i.e. turn away from the object so that it can continue its operation.

One system is detailed in the US patent application published as US 2014/0373497A1 which discloses a lift detection arrangement in a robotic lawnmower for detecting a lift of a body relative a chassis of the robotic lawnmower is provided. The lift detection arrangement comprises a connection between the chassis and the body. The connection comprises a joystick element arranged to allow a displacement of the body relative the chassis in a collision plane during a collision, and a lift element arranged to provide a flexibility between the chassis and the body in a lift direction during the lift. The lift detection arrangement further comprises a lift sensor configured to detect a displacement over a predetermined threshold of the lift element during the lift by detecting a change in spacing between two sensor parts. One of the two sensor parts is arranged on the lift element and the two sensor parts are arranged to be relatively displaceable only in the lift direction.

Such systems are electromechanical, where inputs from a series of sensors, mechanical and/or electrical are combined to determine whether a collision has occurred or not. Such sensors are usually complicated in their design and therefore costly to produce.

As will be discussed below, the inventors have realized problems of the prior art and as such, identified a need for improved collision detection for a robotic work tool.

SUMMARY

As mentioned above in the background section, the inventors have realized, after insightful and inspired reasoning, that as the collision detection system has to account for different structures of the surface of the work area, bumps and holes, and also different topologies the threshold level needs to be set rather high to not give too many false positives, i.e. collision detections when there has in fact not been a collision. Such false positives may lead to an erratic behavior of the robotic work tool and may also lead to that some areas of the work area are not properly serviced as the robotic work tool may find it difficult to operate correctly therein such as in a slope or on a smaller hill which the robotic work tool might find it difficult to reach as the increase in power climbing the slopes might be determined to be collisions.

As also realized by the inventors, having a high threshold leads to that the robotic work tool will push rather hard against an object before it is determined to be a collision which, in turn, may lead to increased wear and tear of the surface of the work area, such as leading to wheel tracks in the grass in front of any objects. Thus, there is a need for improved collision detection for a robotic work tool.

It is therefore an object of the teachings of this application to overcome or at least reduce those problems and problems discussed below by providing a robotic work tool comprising a motor for driving at least one wheel, an inclination sensor and a controller for controlling the operation of the robotic work tool, the controller being configured to: receive a signal indicating a collision; determine if the signal indicating a collision is above a collision threshold level and, if so, determine that a collision has been detected, the robotic work tool being characterized in that the controller is further configured to: receive an indication of an inclination; and to adapt the collision threshold accordingly based on said indication of an inclination.

It is also an object of the teachings of this application to overcome the problems by providing a method for use in a robotic work tool comprising a motor for driving at least one wheel, and an inclination sensor, the method comprising: receiving a signal indicating a collision; determining if the signal indicating a collision is above a collision threshold level and, if so, determining that a collision has been detected, the method being characterized in that the method farther comprises: receiving an indication of an inclination; and adapting the collision threshold accordingly based on said indication of an inclination.

There is also a safety aspect of course to detecting collisions as the collision may be with a living object. To be able to determine the collision quickly and without the robotic work tool colliding abruptly with the living object is of course of a high concern as the person or animal collided with may find it uncomfortable being collided with if the collision is hard. This also leads to the need for a reduced power threshold for detecting a collision.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that all indications of rotational speeds, time durations, work loads, battery levels, operational levels etc. are given as examples and may be varied in many different ways as would be apparent to a skilled person. The variations may be for individual entities as well as for groups of entities and may be absolute or relative.

Figure 1A:
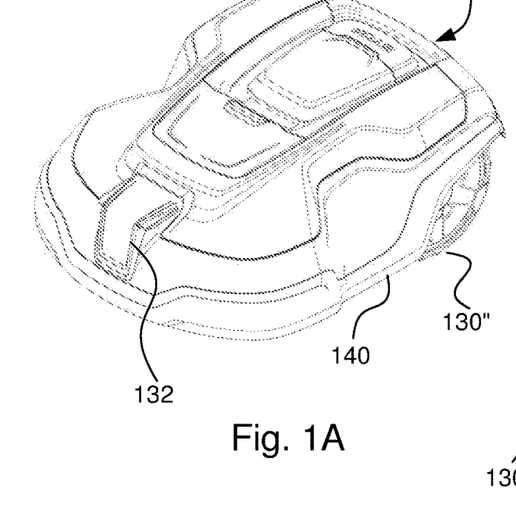
FIG. 1A shows an example of a robotic lawnmower according to one embodiment of the teachings herein.

FIG. 1A shows a perspective view of a robotic working tool 100, here exemplified by a robotic lawnmower 100, having a body 140 and a plurality of wheels 130 (only one shown). As can be seen, the robotic lawnmower 100 may comprise charging skids for contacting contact plates (not shown in FIG. 1, but referenced 230 in FIG. 2) when docking into a charging station (not shown in FIG. 1, but referenced 210 in FIG. 2) for receiving a charging current through, and possibly also for transferring information by means of electrical communication between the charging station and the robotic lawnmower 100.

It should be noted that even though the description given herein will be focused on robotic lawnmowers, the teachings herein may also be applied to robotic cleaners such as robotic vacuum cleaners and/or robotic floor cleaners, robotic ball collectors, robotic mine sweepers, robotic farming equipment, o other robotic work tools to be employed in a work area defined by a boundary cable.

Figure 1B:
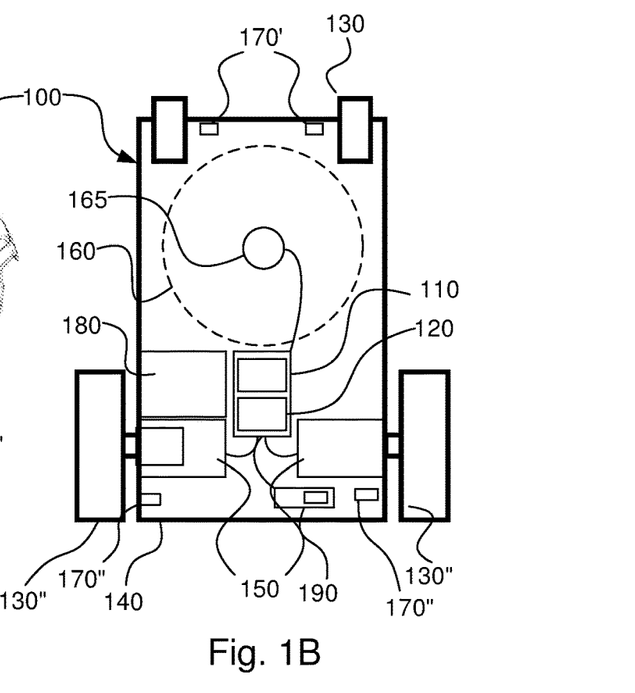
FIG. 1B shows a schematic view of the components of an example of a robotic lawnmower according to one embodiment of the teachings herein.

In the exemplary embodiment of FIG. 1B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The controller 110 is configured to receive an indication of the power level currently being used by the motor 150 in order to determine the power consumption of the motor 150. The power level of the motor 150 may be determined by measuring the current level being delivered to the motor 150.

The controller 110 is further configure to determine that the current power level of the motor 150 is above collision threshold and in response thereto determine that a collision has ben detected and adapt the operation of the robotic lawnmower 100 accordingly, such as by instructing the motor 150 to reverse, and then perform a turn thereby turning the robotic lawnmower 100 away from the object collided with so that operation may continue elsewhere.

The robotic lawnmower 100 may further have at least one sensor 170; in the example of FIG. 1 there are four sensors divided into a first sensor pair 170' and a second sensor pair 170", respectively arranged at each wheel 130', 130" to detect a magnetic field (not shown) and for detecting a boundary cable and/or for receiving (and possibly also sending) information from a signal generator (will be discussed with reference to FIG. 2). The sensors 170 may thus be arranged as front sensors 170' and rear sensors 170".

In some embodiments, the sensors 170 may be connected to the controller 110, and the controller 110 may be configured to process and evaluate any signals received from the sensor pairs 170, 170'. The sensor signals may be caused by the magnetic field being generated by a control signal being transmitted through a boundary cable. This enables the controller 110 to determine whether the robotic lawnmower 100 is close to or crossing a boundary cable, or inside or outside an area enclosed by the boundary cable. This also enables the robotic lawnmower 100 to receive (and possibly send) information from the control signal.

The robotic lawnmower 100 also comprises a grass cutting device 160, such as a rotating blade 160 driven by a cutter motor 165. The grass cutting device being an example of a work tool 160 for a robotic work tool 100. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

Figure 2:
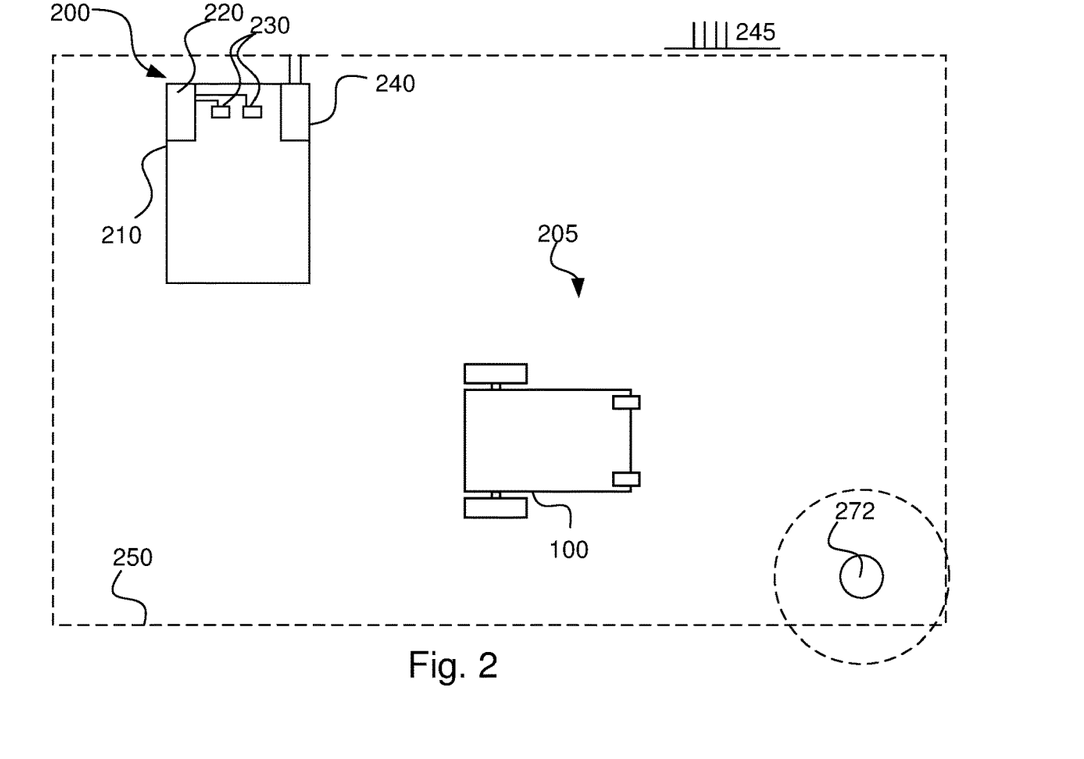
FIG. 2 shows an example of a robotic lawnmower system according to the teachings herein.

FIG. 2 shows a schematic view of a robotic working tool system 200 in one embodiment. The schematic view is not to scale. The robotic working tool system 200 comprises a charging station 210 and a boundary cable 250 arranged to enclose a work area 205, in which the robotic lawnmower 100 is supposed to serve.

As with FIG. 1, the robotic working tool is exemplified by a robotic lawnmower, but the teachings herein may also be applied to other robotic working tools adapted to operate within a work area.

The charging station may have a base plate 215 for enabling the robotic lawnmower to enter the charging station in a clean environment and for providing stability to the charging station 210.

The charging station 210 has a charger 220, in this embodiment coupled to two charging plates 230. The charging plates 230 are arranged to co-operate with corresponding charging plates (not shown) of the robotic lawnmower 100 for charging the battery 180 of the robotic lawnmower 100.

The charging station 210 also has, or may be coupled to, a signal generator 240 for providing a control signal 245 to be transmitted through the boundary cable 250. The signal generator thus comprises a controller for generating the control signal. The control signal 245 comprises an alternating current, such as a continuously or regularly repeated current signal. The control signal may be a CDMA signal (CDMA—Code Division Multiple Access). The control signal may also or alternatively be a pulsed control signal, the control signal thus comprising one or more current pulses being transmitted periodically. The control signal may also or alternatively be a continuous sinusoidal wave. As is known in the art, the current signal will generate a magnetic field around the boundary cable 250 which the sensors 170 of the robotic lawnmower 100 will detect. As the robotic lawnmower 100 (or more accurately, the sensor 170) crosses the boundary cable 250 the direction of the magnetic field will change. The robotic lawnmower 100 will thus be able to determine that the boundary cable has been crossed, and take appropriate action by controlling the driving of the rear wheels 130" to cause the robotic lawnmower 100 to turn a certain angular amount and return into the work area 205. For its operation within the work area 205, in the embodiment of FIG. 2, the robotic lawnmower 100 may alternatively or additionally use the satellite navigation device 190, supported by the deduced reckoning navigation sensor 195 to navigate the work area 205.

Additionally, the robotic lawnmower 100 may use the satellite navigation device (not shown) to remain within and map the work area 205 by comparing the successive determined positions of the robotic lawnmower 100 against a set of geographical coordinates defining the boundary 250, obstacles, keep-out areas etc of the work area 205. This set of boundary defining positions may be stored in the memory 120, and/or included in a digital (virtual) map of the work area 205. The boundary 250 of the work area 205 may also be marked by a boundary cable supplementing the GNSS navigation to ensure that the robotic work tool stays within the work area, even when no satellite signals are received.

As can be seen in FIG. 2, there is one example of an object exemplified as a tree (trunk) 272.

Figure 3:
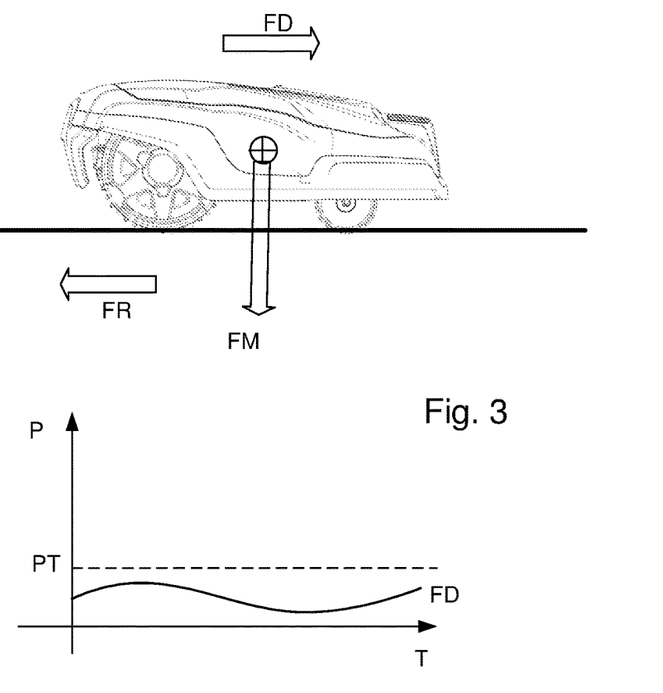
FIG. 3 shows a schematic overview of a robotic lawnmower system, such as that in FIG. 2, in which a robotic lawnmower is configured to detect object(s) according to the teachings herein.

FIG. 3 shows a schematic view of the operation of a robotic lawnmower 100 according to one embodiment. The robotic lawnmower 100 is subjected primarily to one force during operation, namely the rolling resistance of the wheels against the surface, indicated in FIG. 3 by the arrow FR. The friction needs to be overcome by the power of the motor 150 by the motor providing a pushing or driving force, indicated by an arrow FD in FIG. 3, high enough to overcome the rolling resistance. As would be understood by a skilled person, the rolling resistance will depend on the weight depending in turn on the mass of the robotic lawnmower 100, the mass being represented by an arrow marked FM in FIG. 3, the higher the mass, the higher the rolling resistance.

As has been discussed above the controller 110 is configured to detect when the driving force FD, i.e. the power of the motor 150, exceeds a power threshold level and in response thereto determine that a collision has been detected.

Also shown in FIG. 3 is a power to time graph showing how the driving force FD—or power drawn by the motor 150—varies with time. Should the power or driving force FD rise above the power threshold for detecting a collision PT, the controller will detect a collision—and adapt the operation of the robotic lawnmower 100 accordingly. The power threshold for detecting a collision is indicated by the dashed line.

It should be noted that even though the power drawn by the motor 150 and the driving force are different physical entities, they are so closely dependent (the driving force directly given by the power drawn) that they will be used interchangeably herein. A skilled person would understand that if a first power level would be compared to a second force level it is to be understood that the first power level equals the first force level that would be rendered by that first power level and it is in fact the first force level that is compared to the second force level, and vice-versa.

As the incline of the surface of the work area would increase, such as in a slope, the power drawn would as a higher driving force would be needed and this would lead to false positives using a prior art collision detection having a low threshold and the threshold for collision detection of prior art systems are therefore set high to avoid giving such false positives.

Figure 4:
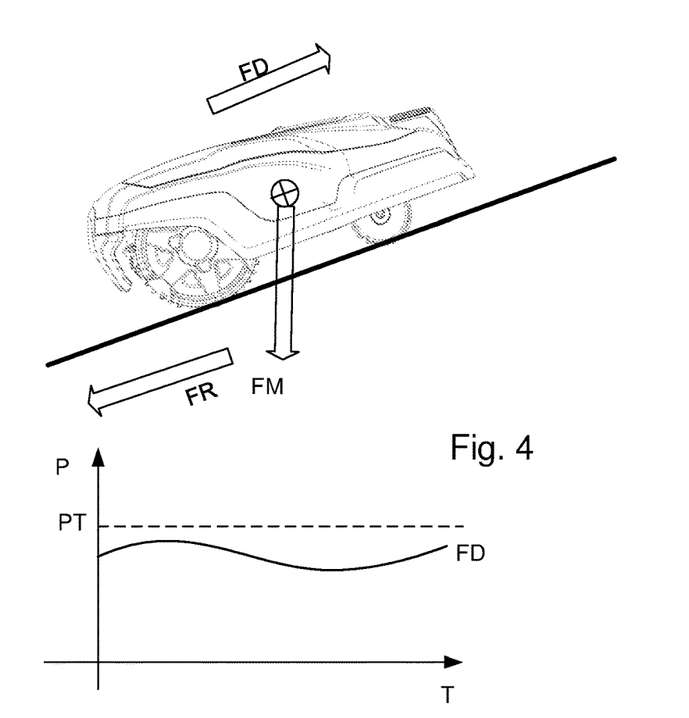
FIG. 4 shows a schematic overview of a robotic lawnmower system, such as that in FIG. 2 or 3, in which a robotic lawnmower is configured to detect object(s) according to the teachings herein.

FIG. 4 shows a schematic overview of a robotic lawnmower system according to herein where the robotic lawnmower 100 is this situation where the robotic lawnmower 100 is at an incline and as a consequence, the driving force being higher due to the increase in rolling resistance, leading to that the power threshold being exceeded giving a false positive, hence necessitating for the higher prior art power threshold.

However, the inventors have realized, that by using inclination sensors for detected a pitch and/or roll of the robotic lawnmower 100, it may be determined that the robotic lawnmower 100 is actually at an incline (or decline) the controller may be configured to adapt the power threshold accordingly.

Figure 5:
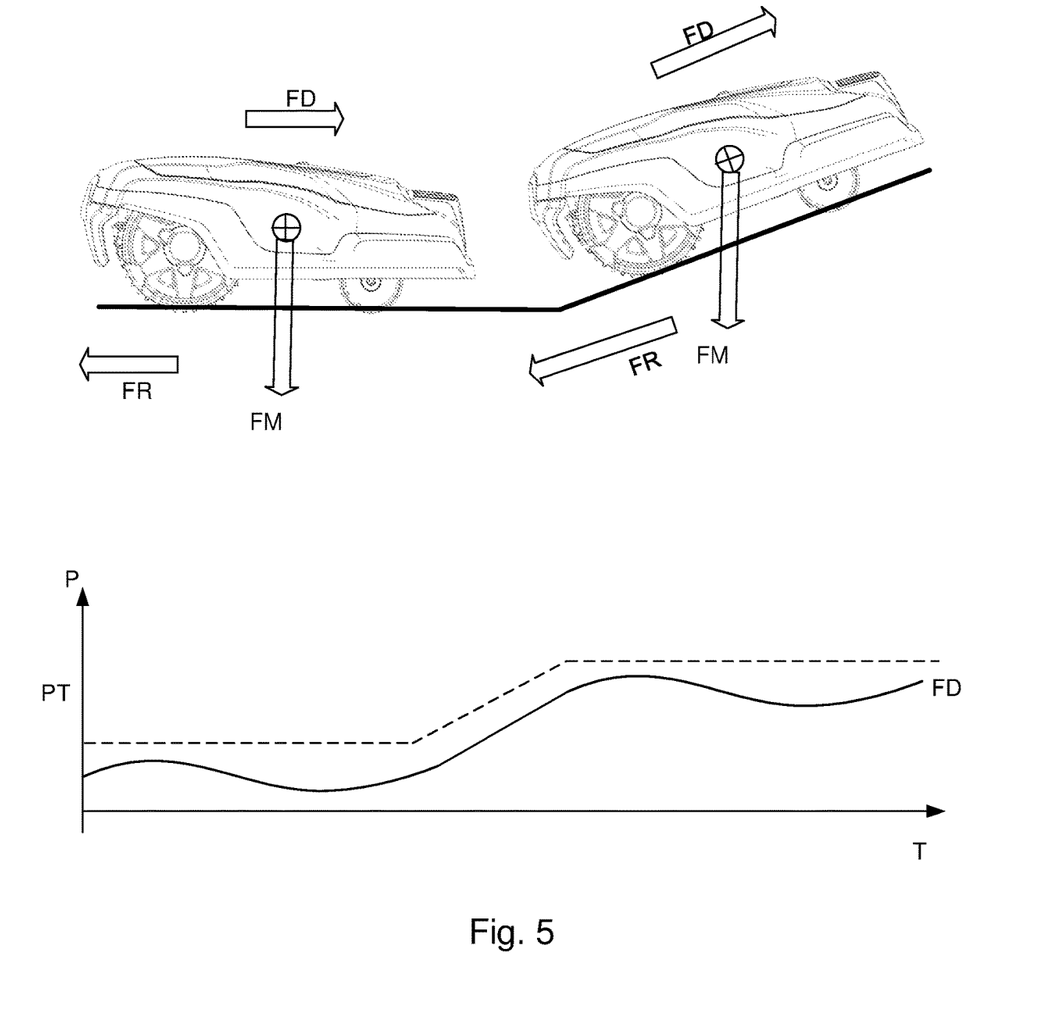
FIG. 5 shows a corresponding flowchart for a method according to an example embodiment.

FIG. 5 shows a schematic overview of a robotic lawnmower system according to herein where the robotic lawnmower 100 is operating first on a flat area (situation A) and later encounters a slope (situation B). When the robotic lawnmower 100 is operating in the flat area (situation A), the power threshold is being kept low as is seen in the time graph. But, as the robotic lawnmower 100 encounters the slope, an inclination sensor 190, will provide input regarding this to the controller 110, which is then configured to determine that the robotic lawnmower 100 is operating at pitch and/or roll indicative of an incline (or decline) and adapt the power threshold accordingly. As can be seen in FIG. 5, as the robotic lawnmower 100 operates on the slope, the power threshold has been increased accordingly.

This allows for the power threshold to be adapted to accommodate for work in slopes.

Likewise, when the controller determines that the robotic lawnmower 100 is no longer operating on a slope, the power threshold will be lowered accordingly.

The controller 110 may be configured to determine an angle of inclination for the work surface and adapt the power threshold accordingly. This enables for a more varied and adaptive setting of the power threshold.

The controller 110 is thus configured to receive input on the current inclination and adapt the power threshold accordingly. In one embodiment the power threshold may be changed stepwise, going from one first level to another second level as the inclination changes.

In one embodiment the power threshold may be changed continuously (or at least as often as the inclination is measured) with the change in inclination, changing gradually from a first level to a second level, possibly via many intermediate third levels.

It should be noted that even though the discussion herein revolves around the power (driving force), the same teachings may be applied to other signals indicating a collision, such as a signal indicating a relative movement of the cover relative the chassis, a signal indicating a collision force received from pressure sensors arranged in the cover or connected to the cover, or other signals indicating a collision. The power signal is thus an example of a signal indicating a collision and the power threshold is an example of a collision threshold.

In one embodiment, the collision signal thus relates to the indication of the power level of the motor 150 discussed above and the collision threshold relates to the power threshold discussed above.

In one embodiment, the robotic lawnmower is further configured to receive an indication of the load experienced by the cutter 165, This load may be determined by monitoring the current or voltage level supplied to the cutter motor. Should the power level for the motor 150 delivered to the wheels 130 increases at the same time as the power level of the cutter motor goes up it may be determined that the increase in power level is indicative of the robotic lawnmower operating in an area with thick or hard to cut grass, such as wet grass. In such a case, the robotic lawnmower is configured to adapt the power threshold accordingly (by raising it if the power of the cutter motor goes up). The same applies when the power delivered to the cutter motor goes down or decreases.

In one embodiment, the robotic lawnmower is further configured to receive an indication of the current surface and adapt the power threshold accordingly. The most important feature of the current surface is the current friction between the wheel(s) and the surface, as an increase in friction (rolling resistance) caused by a change in surface may lead to an increase in power level required to turn the wheels, and the power threshold level should thus be adapted accordingly. The same applies to a decrease in rolling resistance, with the exception that a decrease in rolling resistance may even cause an increase in power as the wheels may start spinning. The robotic lawnmower may therefore also be configured to detect any wheel spin and adapt the power threshold accordingly.

Rolling resistance may be determined by comparing the power delivered and the wheel turning speed.

Wheel spin may be determined by monitoring the wheel turning speed, where a sudden increase or an increase over a threshold level indicates wheel spin.

Figure 6:
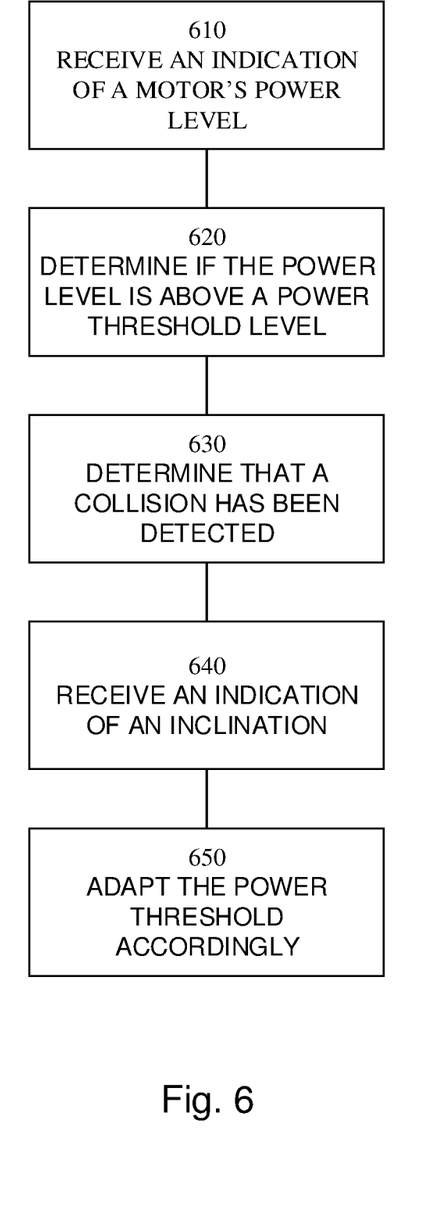
FIG. 6 shows a flowchart for a general method for use in a robotic work tool comprising a motor for driving at least one wheel and an inclination sensor

FIG. 6 shows a flowchart for a general method according to herein where the robotic lawnmower 100 is configured to receive 610 an indication of a motor's power level, possibly through a current level. The controller is further configured to determine 620 if the power level is above a power threshold level and, if so, determine 630 that a collision has been detected. The controller 110 is further configured to receive 640 an indication of an inclination, such as through a pitch and roll sensor, and to adapt the power threshold accordingly 650.

This clearly is beneficial over the cheaper solutions of the prior art based on a simple monitoring of the power drawn by the motor providing the power to propel the wheels of the robotic work tool and, as an object is encountered, the power drawn will rise as the robotic work tool is pushing against the object, and as a rise in power is detected, it may be determined that a collision has happened. Such a rise may be determined to correspond to a collision, by the power rising above a threshold level.

This is also clearly beneficial over the complicated electromechanical prior art systems in that no complicated constructions are needed.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool comprising a motor for driving at least one wheel, an inclination sensor and a controller for controlling the operation of the robotic work tool, the controller being configured to:
receive a signal indicating a collision;
determine if the signal indicating a collision is above a collision threshold level and, if so, determine that a collision has been detected, wherein the controller is further configured to:
receive an indication of an inclination; and
adapt the collision threshold level accordingly based on said inclination indication of the inclination.

2. The robotic work tool according to claim 1, wherein the controller is further configured to determine that the inclination has changed, and in response thereto adapt the collision threshold level.

3. The robotic work tool according to claim 1, wherein the controller is further configured to adapt the collision threshold level gradually.

4. The robotic work tool according to claim 1, wherein the controller is further configured to adapt the collision threshold level stepwise.

5. The robotic work tool according to claim 1, wherein the robotic work tool is further configured to determine the inclination utilizing a pitch and roll sensor.

6. The robotic work tool according to claim 1, wherein the controller is further configured to adapt the collision threshold level by increasing the collision threshold level if it is determined that the inclination has increased.

7. The robotic work tool according to claim 1, wherein the collision signal relates to an indication of a power level of the motor, and the collision threshold level relates to a power threshold.

8. The robotic work tool according to claim 7, wherein the robotic work tool is further configured to detect a change in rolling resistance and/or wheel spin, and adapt the power threshold accordingly.

9. The robotic work tool according to claim 7, wherein the robotic work tool is further configured to detect a change in power delivered to an operating tool and adapt the power threshold accordingly.

10. The robotic work tool according to claim 1, wherein the robotic work tool is a robotic lawnmower.

11. A robotic work tool system comprising a charging station and a robotic work tool, the robotic work tool comprising a motor for driving at least one wheel, an inclination sensor and a controller for controlling the operation of the robotic work tool, the controller being configured to:

receive a signal indicating a collision;

determine if the signal indicating a collision is above a collision threshold level and, if so, determine that a collision has been detected, wherein the controller is further configured to:

receive an indication of an inclination; and adapt the collision threshold level accordingly based on said inclination indication of the inclination.

12. A method for use in a robotic work tool comprising a motor for driving at least one wheel, an inclination sensor and a controller for controlling the robotic work tool, the method comprising:

receiving, at the controller, a signal indicating a collision;

determining, by the controller, if the signal indicating the collision is above a collision threshold level and, if so, determining that a collision event has been detected, the method further comprising:

receiving, at the controller, an indication of an inclination; and adapting, at the controller, the collision threshold level accordingly based on said indication of the inclination.

* * * * *